United States Patent
Cragun et al.

(10) Patent No.: US 9,342,222 B2
(45) Date of Patent: *May 17, 2016

(54) ACCESSIBLE CHART NAVIGATION USING OBJECT NEIGHBORHOOD

(71) Applicant: International Business Machines Corporation, Armonk, NY (US)

(72) Inventors: Brian John Cragun, Rochester, MN (US); Frederick Henry Esch, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,289

(22) Filed: Oct. 5, 2015

(65) Prior Publication Data

US 2016/0026355 A1    Jan. 28, 2016

Related U.S. Application Data

(63) Continuation of application No. 13/874,102, filed on Apr. 30, 2013.

(51) Int. Cl.
*G06F 3/0484* (2013.01)
*G06F 17/30* (2006.01)
*G06T 11/20* (2006.01)

(52) U.S. Cl.
CPC .............. *G06F 3/0484* (2013.01); *G06F 17/30* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 5,757,358 A | 5/1998 | Osga | |
| 5,808,604 A * | 9/1998 | Robin | G06F 3/0481 715/856 |
| 5,870,079 A | 2/1999 | Hennessy | |
| 6,034,689 A * | 3/2000 | White | G06F 3/0236 348/E5.002 |
| 6,154,205 A * | 11/2000 | Carroll | G06F 17/30905 345/684 |
| 6,442,555 B1 * | 8/2002 | Shmueli | G06F 17/3071 |
| 6,563,529 B1 * | 5/2003 | Jongerius | H04N 5/23238 345/629 |
| 6,587,131 B1 | 7/2003 | Nakai et al. | |
| 6,678,891 B1 * | 1/2004 | Wilcox | G06Q 30/0601 348/E5.105 |
| 7,506,275 B2 | 3/2009 | Conradt et al. | |
| 7,554,525 B2 | 6/2009 | Aoyama | |

(Continued)

OTHER PUBLICATIONS

IPCOM000183812D, "Drag and Drop using Key Board", published Jun. 2, 2009.

*Primary Examiner* — Phenuel Salomon
(74) *Attorney, Agent, or Firm* — Garg Law Firm, PLLC; Rakesh Garg; William J. Stock

(57) ABSTRACT

A method, system, and computer program product for accessible chart navigation using object neighborhood are provided. An input is received to navigate a focus away in a direction from a first object, the first object being a member of a set of objects depicted in a graphical visual chart. A set of inputs is designed to access the chart without using a pointing device or requiring visual inspection of the chart and the set of objects. The set of inputs includes the input and a second input to allow return to a previous step in navigating the chart. A second object is identified to which to navigate responsive to the input, the second object being located within a neighborhood of the first object at a shortest neighborhood distance from the first object. Navigation is performed to the second object to keep the focus within the neighborhood.

20 Claims, 9 Drawing Sheets

(56) References Cited

U.S. PATENT DOCUMENTS

| | | |
|---|---|---|
| 7,571,393 B2 | 8/2009 | Premchandran et al. |
| 7,600,201 B2 | 10/2009 | Endler et al. |
| 8,612,873 B2 * | 12/2013 | Lin .................... G01C 21/3682 715/764 |
| 2003/0081859 A1 * | 5/2003 | Kasutani ............. G06F 17/3025 382/305 |
| 2006/0288314 A1 | 12/2006 | Robertson |
| 2007/0256026 A1 * | 11/2007 | Klassen ............. G01C 21/3682 715/764 |
| 2009/0198768 A1 * | 8/2009 | Gao .......................... G06F 9/54 709/203 |
| 2009/0327078 A1 * | 12/2009 | Ohazama ........... G01C 21/3682 705/14.54 |
| 2010/0333042 A1 | 12/2010 | Yoshii |

\* cited by examiner

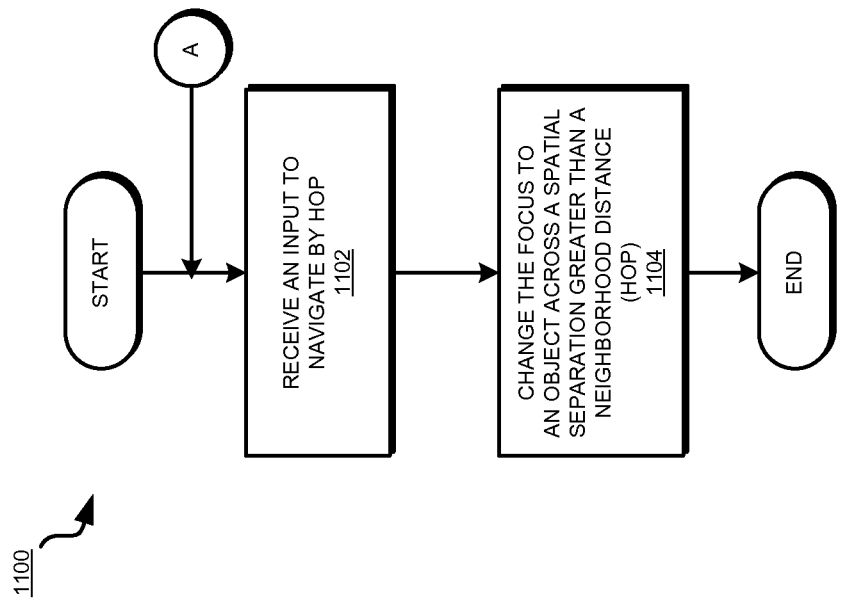
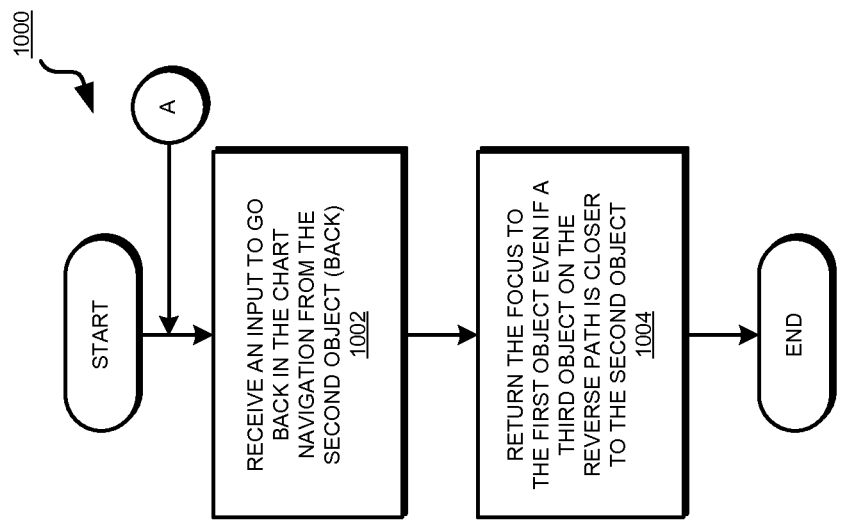

ACCESSIBLE CHART NAVIGATION USING OBJECT NEIGHBORHOOD

BACKGROUND

1. Technical Field

The present invention relates generally to a method, system, and computer program product for manipulating graphically displayed information. More particularly, the present invention relates to a method, system, and computer program product for accessible chart navigation using object neighborhood.

2. Description of the Related Art

Charts are a visual representation of data, which appear in many types of content. Pie charts, bar-graph charts, histograms, scatter charts, and line graphs are some examples of types of charts that are commonly used for graphically presenting visual information.

Accessibility features in software applications are designed to allow users with impairments, disabilities, or limited abilities, to use the software application in the manner the application was intended to be used. Some examples of accessibility features are large fonts, conversion of color-coded information to grayscale, audio readout of written or displayed text, tactile feedback for touch-related interactions, and so on. Accessible applications provide, improve, or enhance the usability of those applications for users with certain impairments, disabilities, or limited abilities.

Graphical information, such as a chart, is particularly difficult to adapt for accessibility. Charts reveal information visually, and often require a visual inspection of the details contained therein. As an example, a person with limited vision would experience difficulty navigating a chart, and would not be able to inspect the details of the information presented in the chart.

Presently available chart interactivity is limited to using a pointing device, such as a mouse peripheral device. However, mouse interaction is not accessible enough for those with vision or mobility limitations. Mouse interaction requires fine motor skills, which many users either do not possess or are limited in that ability.

Mouse interaction is also difficult under certain circumstances. For instance, using a mouse on a subway may not be practical.

Furthermore, mouse interaction is not supported on many devices, such as smartphones. Therefore, usability of a chart is limited on such devices because of the limited ways in which a user can interact with the chart on these devices.

SUMMARY

The illustrative embodiments provide a method, system, and computer program product for accessible chart navigation using object neighborhood. An embodiment for accessible chart navigation using object neighborhood includes receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart. The embodiment further includes identifying a second object to which to navigate responsive to the input, the second object being located within a neighborhood of the first object at a shortest neighborhood distance from the first object. The embodiment further includes navigating to the second object such that the navigation keeps the focus within the neighborhood of the first object.

Another embodiment comprising a computer usable storage device including computer usable code for accessible chart navigation using object neighborhood includes computer usable code for receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart. The embodiment further includes computer usable code for identifying a second object to which to navigate responsive to the input, the second object being located within a neighborhood of the first object at a shortest neighborhood distance from the first object. The embodiment further includes computer usable code for navigating to the second object such that the navigation keeps the focus within the neighborhood of the first object.

Another embodiment for accessible chart navigation using object neighborhood includes a storage device including a storage medium, wherein the storage device stores computer usable program code. The embodiment further includes a processor, wherein the processor executes the computer usable program code, and wherein the computer usable program code comprises computer usable code for receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart. The embodiment further includes computer usable code for identifying a second object to which to navigate responsive to the input, the second object being located within a neighborhood of the first object at a shortest neighborhood distance from the first object. The embodiment further includes computer usable code for navigating to the second object such that the navigation keeps the focus within the neighborhood of the first object.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 depicts a flowchart of another example process for selecting an object for target object determination according to a neighborhood distance in accordance with an illustrative embodiment;

FIG. 10 depicts a flowchart of an example process for a back operation in accessible chart navigation using object neighborhood in accordance with an illustrative embodiment; and FIG. 11 depicts a flowchart of an example process for a hop operation in accessible chart navigation using object neighborhood in accordance with an illustrative embodiment.

DETAILED DESCRIPTION

Figure 1:
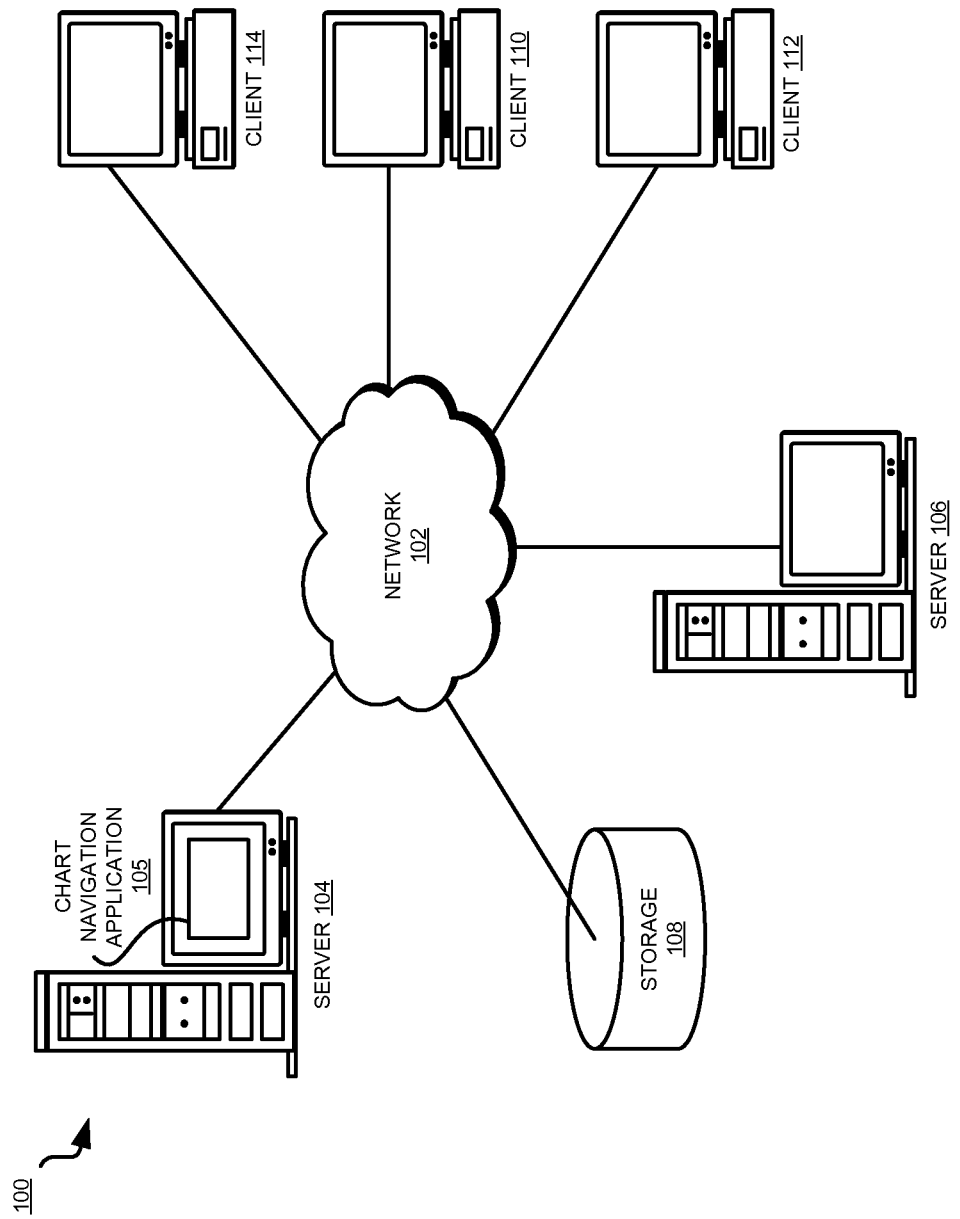
FIG. 1 depicts a block diagram of a network of data processing systems in which illustrative embodiments may be implemented.

The illustrative embodiments recognize that the visual information revealed in charts allows users to automatically build mental visual groupings (visual groups), identify patterns, decode patterns, identify areas of interest, and visually inspect details. The illustrative embodiments recognize that a person with limited vision cannot easily navigate through a chart, gather information about groups, decoding patterns, or inspect the details in a comparable manner.

The illustrative embodiments further recognize that for meeting accessibility requirements, presently, chart data is converted into a table form. Tables are a very poor substitute for a chart, as the user cannot build visual groups, decode patterns, or identify areas of interest using tabular data in the same way the user can in a visually presented chart. Thus, tables do not communicate the information in the manner the chart creator intended. Using a table does make a chart technically accessible to some extent; however, presently, tables suffice as an accessibility solution for charts only because there are currently no better accessibility alternatives for chart presentations.

The illustrative embodiments further recognize that merely by viewing the chart, a user—sighted or unsighted, cannot perceive whether some objects presented on the chart are obscured by other objects on the chart. For example, in a scatter plot with circular objects of different sizes, a small object can be completely hidden or obscured by another object of the same or larger size located in the same or a proximate location. The illustrative embodiments recognize that without a way to systematically and logically navigate through the chart objects, a user will not be able to find out if hidden objects exist on the chart. Consequently, information pertaining to the hidden objects can escape the user's attention.

The illustrative embodiments recognize that other presently available methods for navigating charts, such as using keystrokes or gestures, suffer from a number of other shortcomings. For example, using keystrokes to move from one object to the next object, such as to an object of a higher X or Y coordinate value, does not provide acceptable behavior. For example, such a manner of navigation often jumps, seemingly randomly, across visual groups of objects, merely because the object with the next higher X or Y coordinate value appears where it does on the X or Y axis, and disregarding the fact that the object appears in a different visual grouping. Users find such behavior of alternative navigation of charts unacceptable and frustrating.

The illustrative embodiments used to describe the invention generally address and solve the above-described problems and other problems related to navigating charts. The illustrative embodiments provide a method, system, and computer program product for accessible chart navigation using object neighborhood.

An embodiment provides a method of using a keyboard or gestures relative to a set of objects in a chart, which allows the user with limited abilities to navigate the chart in a manner that approximates the use by a user without such limitations. For example, using an embodiment, a visually impaired user can perceive a grouping of objects on the chart similar to the visual grouping apparent to a sighted user.

An embodiment maps the keys on a keyboard to a logical next and previous element in a desired direction. An embodiment further avoids unintended jumps across visual groups of objects during navigation just because of some ordinal ordering among the objects. An embodiment provides affirmative navigation controls to deliberately jump or hop from one visual group of objects to another visual group of objects if the user intends to make the hop.

An embodiment allows a user to retrace their navigation steps, and to orient themselves to known locations in a given chart. Furthermore, an embodiment can be implemented in an environment that does not support a mouse or a pointing device based chart interaction, such as some smartphones.

Directional Neighborhood Navigation (DNN) according to the illustrative embodiments provides directional navigation, such as left, right, up, or down navigation, in charts. An embodiment correlates a directional move request to a command or input that can be entered in any manner. For example, a directional move request according to an embodiment can be associated with an arrow key keystroke on a keyboard.

Because users spatially group objects in a chart, forming visual groups within the chart, an embodiment anticipates that the user expects to move within a group when providing an input to navigate a chart, and uses DNN to provide this movement on the chart. According to an embodiment, DNN supports a "back" movement and a "hop movement. The "back" movement (back operation) allows a user to traverse their previous movements in a reverse order. The "hop" movement (hop operation) operates in conjunction with a direction, e.g., left, right, up, or down, to allow a user to change the focus from one visual group to another.

Using an embodiment, a user may reach the limit of a group in a requested direction. From there, to keep moving, the user can go "back" and proceed in a different direction or request a movement in a new direction. Continuing in the requested direction can also progress the user naturally to an object in an adjacent group without a hop operation. Using an embodiment, a user can optionally create anchor points within the chart, such as within a group of objects, to which the user can return in a "back" operation. An embodiment allows associating the setting and returning to anchor points to certain commands or inputs, such as, for example, to certain keystrokes.

According to an embodiment, DNN uses a neighborhood distance measurement technique to identify the next object to move to within the context of a group, when given a request to move in a certain direction. DNN determines the next target object, to which to shift the user's focus from the current object, by evaluating a neighborhood of the current object. A neighborhood of an object includes one or more candidate target objects that lie in the general requested direction within a weighted distance from the object. The closest of such candidate target objects is selected as the target object to which to shift the user's focus upon a request to move in a direction from the current object.

Thus, DNN allows movement in the requested direction, while obeying the grouping of the objects on the chart, and without wrapping or moving orthogonal to the requested direction. For example, in one embodiment, if the requested direction of movement is indicated by the right arrow keystroke, the neighborhood is defined by an ellipse whose major chord is along the X axis and the minor chord is along the Y axis, and the proportionality between the major chord and minor chord is controlled by a weight factor. The weight factor allows limiting the neighborhood in a direction orthogonal to the requested direction.

An embodiment computes the neighborhood distance between the current object and a target object by computing (a square root of
  (a sum of
    (a square of
      (the difference between the X coordinates of the current object and a candidate target object)
    )
    and
    (a weight multiplied to
      (a square of
        (the difference between the Y coordinates of the current object and a candidate target object)
      )
    )
  )
)

Only as an example, consider that the weight is 3. Thus, an object that is 5 units farther on X axis is likely to be in the neighborhood but another object that is 5 units farther on the Y axis is not.

DNN evaluates the distance from the current object to a candidate target object and saves the candidate target object as a reference boundary of the neighborhood. DNN evaluates another distance from the current object to another candidate target object and compares the second distance with the saved reference boundary of the neighborhood. If the second candidate target object is closer to the current object than the first candidate target object, DNN discards the first candidate target object, and saves the second distance as the reference boundary of the neighborhood, thus shrinking the size of the neighborhood.

DNN progressively evaluates candidate target objects in this manner until DNN determines that the next candidates are obviously farther than the selected reference neighborhood boundary. For a candidate target object to become the target object of the movement, the target object has to be the closest object in the desired general direction of the movement. DNN then moves the focus from the current object to the target object. Subsequent movements from there are evaluated in a similar manner.

For example, assume the following objects on a chart—A=(1,1), B=(2,2), C=(5,0), D=(1,4), E=(4,1), and E=(0,1). Further assume that the current object in focus is object A, and the user requests a movement by pressing the right arrow key on the keyboard. Neighborhood distances $AB=\sqrt{(2-1)^2+3(2-1)^2}=2$ $AC=\sqrt{(5-1)^2+3(0-1)^2}=4.35$ $AD=\sqrt{(1-1)^2+3(4-1)^2}=5.19$ $AE=\sqrt{(4-1)^2+3(1-1)^2}=3$ AF is not evaluated because E lies in a direction substantially opposite of the requested direction.

DNN selects B as the target object, which lies in a right-upwardly direction from A, and not E which lies exactly to the right of A, even though the requested move is to the right from A using the right arrow key. B lies in the neighborhood of A generally to the right of A according to an embodiment and not E.

The illustrative embodiments are described with respect to certain charts, layouts, coordinate systems, distances, directions, keystrokes, and objects only as examples. Such artifacts are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
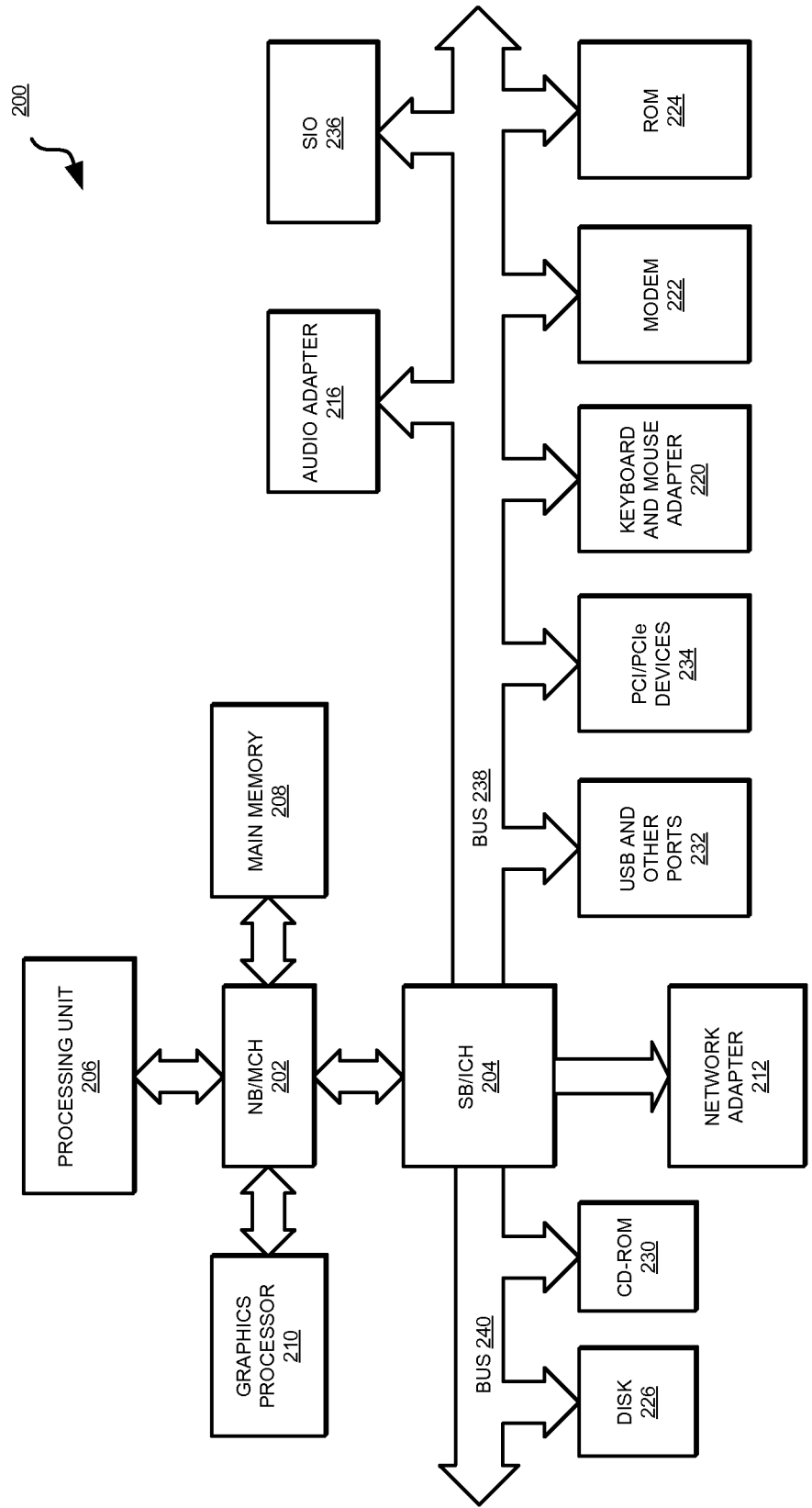
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is a chart navigation application and includes an implementation of an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as chart navigation application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
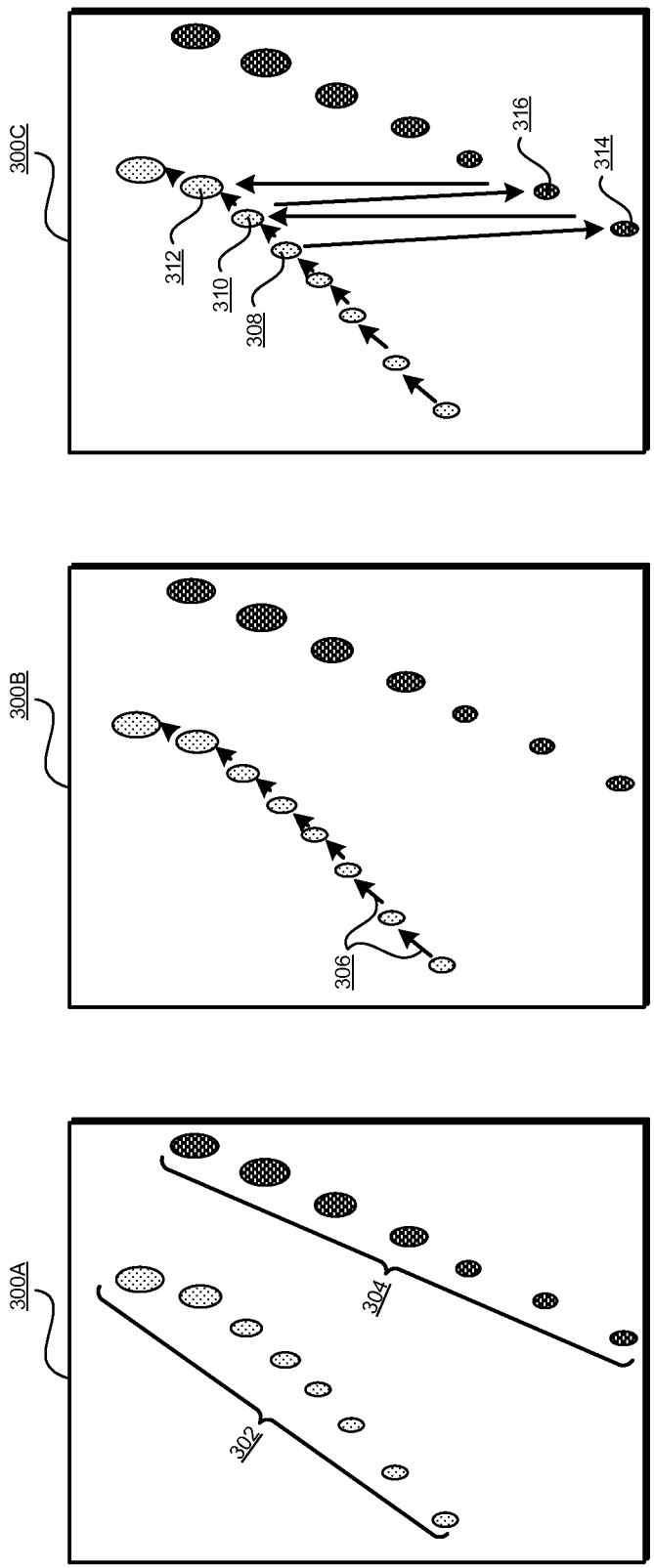
FIG. 3 depicts an example chart in which the navigation can be improved using an illustrative embodiment.

With reference to FIG. 3, this figure depicts an example chart in which the navigation can be improved using an illustrative embodiment. Charts 300A, 300B, and 300C are three views of the same example chart. As an example, navigation according to chart 300B is made possible by chart navigation application 105 in FIG. 1.

Chart 300A depicts visual groups 302 and 304 of objects. Notice that the objects in groups 302 and 304 are not expressly grouped in chart 300A, but the grouping is visually apparent by visually inspecting the objects depicted in chart 300A.

As shown in chart 300B, a user may desire to perform the navigations depicted by example navigation arrows 306. For example, the user may depress the right arrow key on a keyboard and expect the navigation to progress, not exactly to the right, but to the right and in a slight upwardly direction, to the next object in group 302.

For example, as in chart 300C, the user may intend to traverse from object 308 to 310 to 312 by pressing the right arrow key. However, presently, pressing the right arrow key has the unintended result of progressing from object 308 to 314 to 310 to 316 to 312, because that is order in which the objects appear along the X-axis, which corresponds to the direction of movement corresponding to the right arrow key. An embodiment allows the user to realize the desired movement as shown in chart 300B by pressing the right arrow key.

Figure 4:
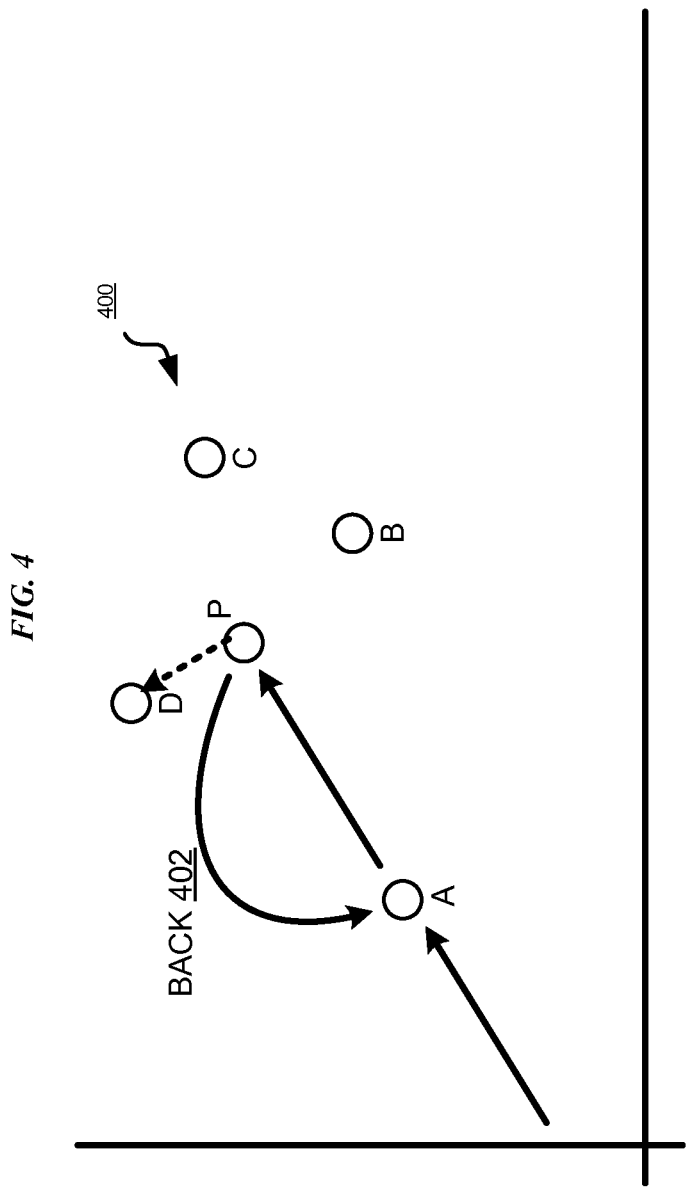
FIG. 4 depicts an example chart with a "back" operation in accordance with an illustrative embodiment.

With reference to FIG. 4, this figure depicts an example chart with a "back" operation in accordance with an illustrative embodiment. Chart 400 can be used as chart 300B in FIG. 3. Back operation 402 can be implemented in chart navigation application 105 in FIG. 1.

"Back" operation 402 represents retracing navigation steps backwards. Back operation 402 is an important concept in chart navigation. Consider, for example, multiple points A, B, C, and D represented as objects on chart 400. Each of these points can have the same point, P, as the nearest neighbor in a direction. For example, P is nearest to A in a right-upwardly direction, and a right arrow key might move from A to P. Similarly, P is nearest to B, C, and D in a direction, and navigation from B, C, or D can also reach P by using an arrow key. However, P can only have one of A, B, C, or D as P's nearest neighbor, when navigating the chart backwards from P. Navigating from A using the right direction, P is the nearest neighbor, but navigating in the left direction from P, D is the nearest neighbor in the left direction, as depicted in example graph 400.

Furthermore, nearest neighbor in one direction may be a singular choice, but the opposite direction may provide multiple possible navigations to a plurality of alternatives (not shown). Such disagreements in opposite direction have the potential for causing a user to get lost while navigating the chart. An embodiment makes it convenient for a user to go back to reach some object, such as object A from object P, rather than navigate a new path in the chart, such as to object D from object P. The back operation helps ensure the user can return to where they were before in their navigation, i.e., to A.

Figure 5:
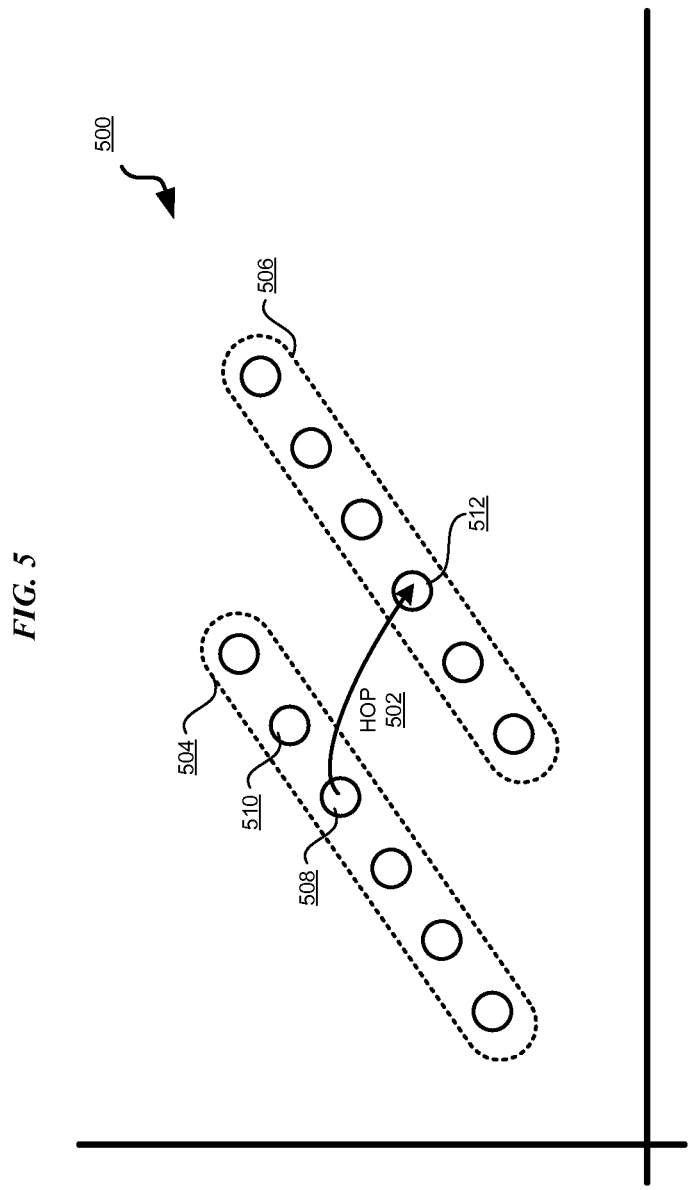
FIG. 5 depicts an example chart with a "hop" operation in accordance with an illustrative embodiment.

With reference to FIG. 5, this figure depicts an example chart with a "hop" operation in accordance with an illustrative embodiment. Chart 500 can be used as chart 400 in FIG. 4. Hop operation 502 can be implemented in chart navigation application 105 in FIG. 1.

Hop operation 502 allows a user to hop between groupings of objects in visual neighborhoods, such as across groups 504 and 506, without naturally progressing to another adjacent group upon reaching a previous group's boundary. Hop operation 502 finds a target object in a requested direction, e.g., right, that may be outside a visual grouping and not reachable by a command for a directional movement within a group. Hop operation 502 allows crossing a visual group to another visual group with different directional movement commands. For example, object 508 has object 510 to the right in group 504, and a movement to the right would progress the navigation from object 508 to object 510 according to an embodiment. However, hop operation 502 in conjunction with the movement to the right allows the user to hop across group 504 to object 512 in group 506.

As another example, assume a star shaped object in the center of a circle of star shaped objects (not shown). Assume that center star is neighborhood "A" and the circle of stars is neighborhood "B." While moving from the center star to a star in the circle is possible with a directional movement command, moving from a star in the circle to the center star may not be possible only with a directional command. The hop operation allows a user to hop between visual neighborhoods, such as from a star in the circle to the center star. Thus, the hop operation allows an embodiment to facilitate navigation to every object in the chart, especially to an island of objects within the chart.

Figure 6:
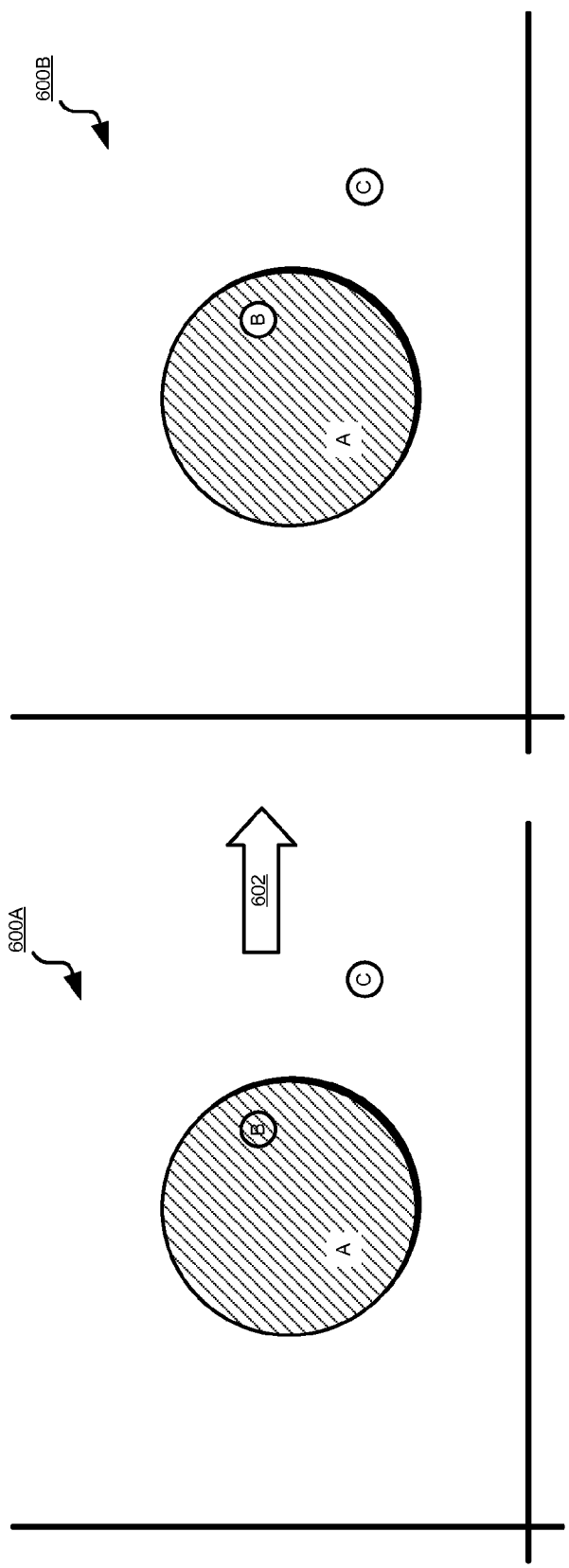
FIG. 6 depicts an example of accessible chart navigation using object neighborhood with obscured objects in accordance with an illustrative embodiment.

With reference to FIG. 6, this figure depicts an example of accessible chart navigation using object neighborhood with obscured objects in accordance with an illustrative embodiment. Movement 602 is a chart navigation operation according to an embodiment that can be implemented using chart navigation application 105 in FIG. 1. Charts 600A and 600B are two stages of the same chart using a chart navigation method according to an embodiment.

A user, whether sighted or unsighted, cannot perceive merely by viewing chart 600A, that object B is obscured by object A. Consequently, information pertaining to hidden object B can escape the user's attention.

An embodiment accepts a command to navigate to the right of object A. The embodiment determines that object B is in the neighborhood of object A due to the neighborhood distance between them being less than the distance between objects A and C. Accordingly, in performing movement 602 corresponding to the command, the embodiment determines that the focus should move from object A to hidden object B, and not to object C, even though both objects B and C are to the right of object A. Thus, an embodiment operates consistent with a user's expectation that even if the user could not see object B, if B were generally in the direction of the requested movement and closer than C from A, then the focus should move to B not C.

FIGS. 4, 5, and 6 depict some example features of DNN as implemented in various embodiments. DNN uses a neighborhood distance measure to find the next object to move to as the target of the next focus. In one example embodiment, for a two-dimensional chart, the neighborhood distance includes the x and y component distances, plus a neighborhood value, to find the nearest point. Once the nearest point is found, DNN moves the focus to that nearest point in response to a command to move in a desired direction. Similarly, in another example embodiment, for a three-dimensional chart, the distances include the x, y and z component distances, plus a neighborhood value. Likewise, a four-dimensional chart, such as a chart with a time axis, the distances include x, y, z and t component distances, plus a neighborhood value.

Additional embodiments apply extension of principles of DNN to non-directional flavors of Neighborhood Navigation (NN). NN includes navigating on non spatial information, such as metadata values, aesthetic values, or size, for determining neighborhood distance. For example, the size of objects may be included in, or used instead of an ordinal value in a neighborhood distance calculation. Generally, any characteristic of an object can be reduced or transformed to a value. The value can then be sorted and used in neighborhood distance computations as described earlier.

As another example, objects of similar aesthetic characteristics, such as shape, may be included in neighborhood distance calculation. For example, circular objects in the chart may be considered closer in shape to each other than other objects that are squares, star shaped, triangles, and other shapes.

As another example, a group may comprise those objects whose metadata includes a common keyword or a variation thereof, a common theme or concept, information pertaining to a common subject, or other types of common metadata. An embodiment uses a metadata value in the object to identify objects of interest according to that metadata such that a user can use NN to move from more interesting to less interesting objects, and vice versa.

An embodiment permits adapting NN to other models for measuring distance between objects or ordering objects. For example, an embodiment allows grouping using NN such that chart navigation progresses from smaller to larger objects on the chart, regardless of their distances or directions.

Furthermore, an embodiment allows making available several flavors of DNN and NN simultaneously for navigating a chart. As an example, in one embodiment, different flavors of Neighborhood Navigation are associated with different sets of keys on a keyboard, so that more than one flavor of DNN or NN can be used on the same chart. For example, DNN could be bound to the arrow keys, and 'shift+arrow keys' could be bound to move to the next most interesting object.

The principles of DNN are also extendable to more than two axes of content, with keystrokes or gestures assigned for traversing the other axes. For example, in one example embodiment, the keys for letters Z and W may be assigned to move closer and further, respectively, from the user view plane into a three-dimensional chart.

An embodiment allows mapping chart navigation from a multi-axes view to a lesser number of dimensions. For example, a three-dimensional chart can be mapped to a two-dimensional view that can be navigated solely with Up, Down, Right, and Left keys, taking into account the view angle of the user.

In one embodiment, an example algorithm for DNN on two-dimensional charts operates as follows—the chart objects are placed in two lists. The objects are sorted according to their Y coordinates in one list, and according to their X coordinates in the other. When moving in the increasing direction, such as moving in the rightward general direction on the positive side of the X axis, or when moving in the upward general direction on the positive side of the Y axis, only objects with a greater value along that axis are evaluated for nearness. The number of objects evaluated for nearness is tunable. For example, a number above a threshold calls for evaluating objects farther than a threshold distance from the object at the current focus, and vice versa. The threshold specifies a neighborhood distance, to wit, a distance that the group spans. The neighborhood distance is a function of the direction and angle between two objects, and helps an embodiment constrain the movements to within a visual neighborhood.

For computational efficiency and desirable navigational behavior, an embodiment uses the square of the non-directional distance for the neighborhood value. Thus, according to such an embodiment, the neighborhood distance used in evaluating nearness is as follows—

For movement in the x direction $$\text{distance}^2 = (\text{delta } x)^2 + 2(\text{delta } y)^2$$

For movement in the y direction $$\text{distance}^2 = 2(\text{delta } x)^2 + (\text{delta } y)^2$$

Where delta x is the difference between the x coordinates of the objects being considered, and delta y is the difference between the y coordinates of the objects being considered.

The various operations, computations, formulae, algorithms, characteristics, and metadata are described only as examples and not as a limitation on the illustrative embodiments. Those of ordinary skill in the art will be able to conceive many other comparable aspects for a similar purpose from this disclosure and the same are contemplated within the scope of the illustrative embodiments.

Figure 7:
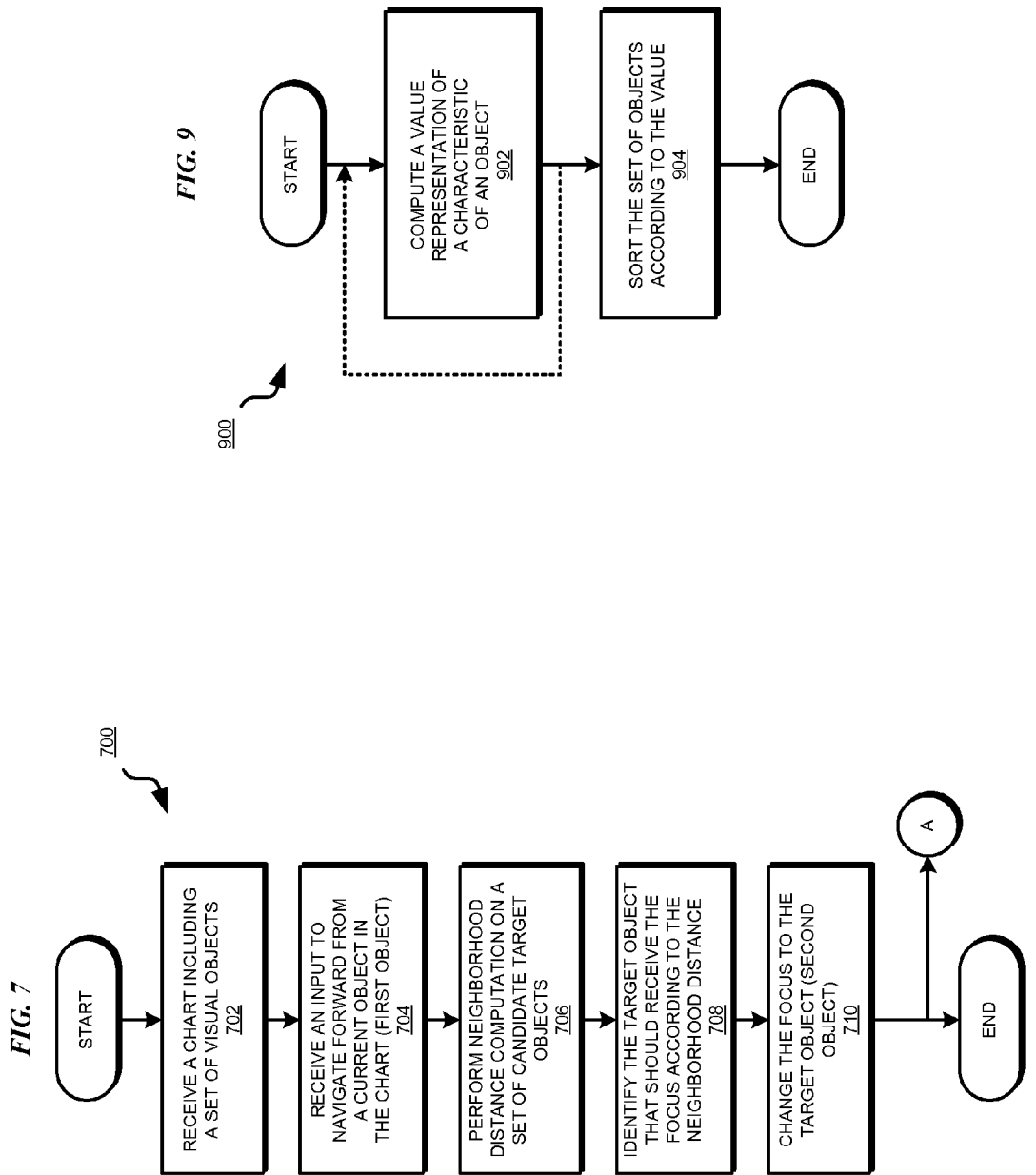
FIG. 7 depicts a flowchart of an example process for accessible chart navigation using object neighborhood in accordance with an illustrative embodiment.

With reference to FIG. 7, this figure depicts a flowchart of an example process for accessible chart navigation using object neighborhood in accordance with an illustrative embodiment. Process 700 can be implemented in chart navigation application 105 in FIG. 1.

Process 700 begins by receiving a chart that includes a set of visual objects (step 702). Process 700 receives an input to navigate in a direction, such as a forward direction, from a current object, or a first object that is the subject of a current focus, in the chart (step 704).

Process 700 performs neighborhood distance computations on a set of candidate target objects that lie in general desired direction, such as within a certain angle from the desired direction of the movement and not opposite or orthogonal to the desired direction of the movement, (step 704). For example, process 700 identifies those objects as candidate target objects that are within a threshold distance and in a general desired direction from a reference point, such as from the current object. Other characteristics of objects can be reduced to a value, and can also be similarly used in the neighborhood distance computation. Thus, objects that share a common characteristic or a variation thereof, have a characteristic that is within a specified range or ordering of the characteristic, or a combination of these and other criteria described in this disclosure, are selectable for performing neighborhood distance computations within the scope of the illustrative embodiments.

Process 700 computes the nearest candidate target object amongst the various candidate target objects and identifies that object as the target object that should receive the focus from the first object according to its neighborhood distance from the first object (step 708). Process 700 changes or moves the focus from the first object to the next object—the second object (step 710). Process 700 either ends thereafter, or exits via the exit point marked "A" to enter another process, such as process 1000 in FIG. 10 via the corresponding entry point marked "A" in FIG. 10, or process 1100 in FIG. 11 via the corresponding entry point marked "A" in FIG. 11.

Figure 8:
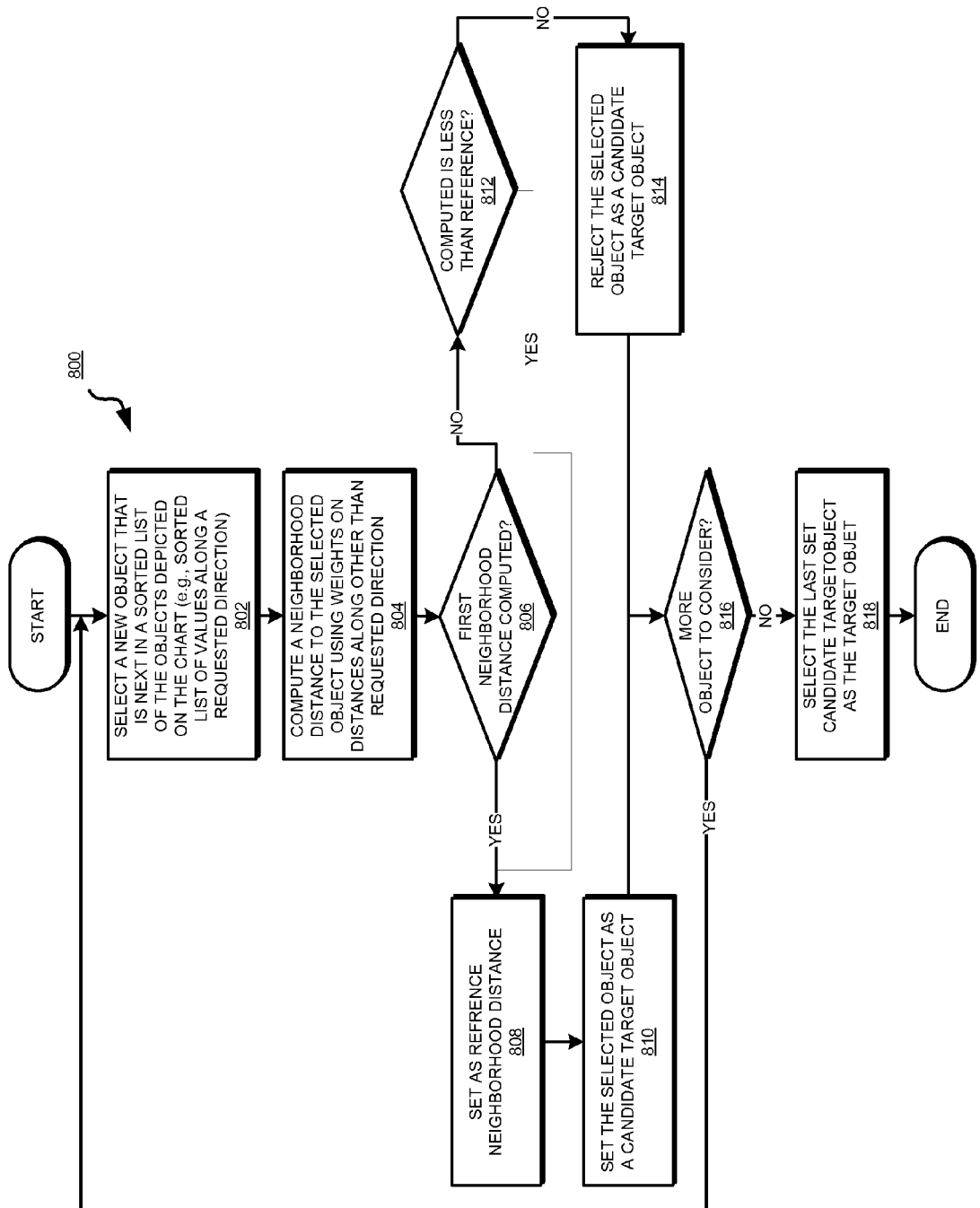
FIG. 8 depicts a flowchart of an example process for computing neighborhood distances in accordance with an illustrative embodiment.

With reference to FIG. 8, this figure depicts a flowchart of an example process for computing neighborhood distances in accordance with an illustrative embodiment. Process 800 can be implemented as steps 706 and 708 in process 700 in FIG. 7.

Process 800 begins by selecting an object that is next in a sorted list of the objects depicted on the chart (step 802). For example, the sorted list can be a list of values for the objects as mapped along a direction of movement. Process 800 computes a neighborhood distance from a current object, such as the first object in FIG. 7, to the selected object, using suitable weights on distances along other-than-requested directions (step 804). Some non-limiting manners of weighting are described in the examples in this disclosure.

Process 800 determines whether the computation of step 806 is the first neighborhood distance computation (step 806). If the computation of step 806 is the first neighborhood distance computation ("Yes" path of step 806), process 800 sets the computed neighborhood distance as a reference neighborhood distance (a distance to beat to become the next candidate target object) (step 808). Process 800 sets the selected object as the present candidate target object (step 810).

If the computation of step 806 is not the first neighborhood distance computation ("No" path of step 806), process 800 determines whether the computed neighborhood distance is less than the saved reference neighborhood distance (step 812). If the computed neighborhood distance is less than the saved reference neighborhood distance ("Yes" path of step 812), process 800 proceeds to step 808 and continues there from. If the computed neighborhood distance is not less than the saved reference neighborhood distance ("No" path of step 812), process 800 rejects the selected object as a candidate target object (step 814).

Process 800 determines whether more objects in the sorted list should be considered (step 816). For example, an embodiment may set a threshold distance within which to look for a candidate target object. The threshold distance may translate into a depth in the sorted list, and the search for a target object would consider the objects up to that depth.

If more objects in the sorted list should be considered ("Yes" path of step 816), process 800 returns to step 802 and selects another object. If no more objects in the sorted list should be considered ("No" path of step 816), process 800 selects the last saved candidate target object as the target object (step 818). Process 800 ends thereafter.

With reference to FIG. 9, this figure depicts a flowchart of another example process for selecting an object for target object determination according to a neighborhood distance in accordance with an illustrative embodiment. Process 900 can be implemented as a step prior to step 802 in FIG. 8, to provide the sorted list of step 802 in FIG. 8.

Process 900 begins by computing a value representation of a characteristic of an object (step 902). Step 902 may repeat for all or some objects depicted on a chart. For example, a shape, color, size, orientation, metadata, or another characteristic of an object can be converted into a numeric value in step 902 using known techniques.

Process 900 sorts the set of objects whose values have been computed in step 902, according to those values (step 904). Process 900 ends thereafter.

With reference to FIG. 10, this figure depicts a flowchart of an example process for a back operation in accessible chart navigation using object neighborhood in accordance with an illustrative embodiment. Process 1000 can be implemented together with process 700 of FIG. 7 in chart navigation application 105 in FIG. 1.

Process 1000 begins by receiving an input to go back in the chart navigation from the second object, such as the second object reached in step 710 in FIG. 7 (step 1002). Process 1000 returns the focus to the first object, such as the first object in step 706 in FIG. 7, even if a third object on the reverse path from the second object is closer to the second object than the first object (step 1004). Process 1000 ends thereafter.

With reference to FIG. 11, this figure depicts a flowchart of an example process for a hop operation in accessible chart navigation using object neighborhood in accordance with an illustrative embodiment. Process 1100 can be implemented together with process 700 of FIG. 7 in chart navigation application 105 in FIG. 1.

Process 1100 begins by receiving an input to navigate with hop, such as to leave an object in one visual group and move the focus to another object in a different group or across a spatial separation that is larger than a neighborhood distance (step 1102). Process 1100 changes the focus to an object across the spatial separation, such as to a group adjacent to the group in which the object of the current focus is a member (step 1104). Process 1100 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for accessible chart navigation using object neighborhood. An embodiment fills a chart navigation accessibility gap in the presently available technologies. DNN and NN assistive tools according to an embodiment can report information about all chart objects and allows a user with vision or motor skills impairments to gather information in a chart, including investigating visual groups, analyzing patterns and investigate details. An embodiment enables providing a richer interactive environment for chart users with or without perfect use of their sensory abilities. For example, an embodiment allows a user who cannot use a mouse to see tooltips, and operate other controls that would normally performed using a mouse, by treating the tooltips and other controls as objects on a chart.

An embodiment, such as an embodiment using DNN or NN, supports chart interactions and movements with directional commands without the use of a pointing device. An embodiment allows systematically investigating a chart, navigating through dense—often interesting—areas, systematic navigation through a visual group of objects in a chart, providing a back movement during chart navigation, anchor points to go to, and selecting and investigating hidden objects. DNN provides chart navigation that can be used on platforms like smartphones that do not support mouse navigation, and in environments, such as a moving vehicle, where a mouse may not be practical to use.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for accessible chart navigation using object neighborhood, the method comprising:
receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart;
identifying a second object to which to navigate responsive to the input, the second object being located within a neighborhood of the first object at a shortest neighborhood distance from the first object; and navigating to the second object such that the navigation keeps the focus within the neighborhood of the first object.

2. The method of claim 1, wherein the neighborhood is visually perceptible as a part of a visual group from a visual observation of the chart, wherein the neighborhood includes an area stretching along the direction and progressively reducing by a weight factor up to an angle from the direction, and excludes areas at angles greater than orthogonal to the direction.

3. The method of claim 1, wherein the neighborhood distance is computed by weighting a value corresponding to the second object such that the value is not coincidental with the direction.

4. The method of claim 3, wherein the value is an ordinal value of the second object along an axis of the chart wherein the axis is orthogonal to a second axis corresponding to the direction.

5. The method of claim 1, wherein the neighborhood distance is computed using a value corresponding to the second object, wherein the value is computed using a characteristic of the second object, and wherein the characteristic is one of (i) a shape, (ii) a size, and (iii) a metadata associated with the second object.

6. The method of claim 1, further comprising:
sorting the set of objects according to a first value associated with each object in the set of objects;
sorting the set of objects according to a second value associated with each object in the set of objects; and
computing the neighborhood distance using a first weight in conjunction with a difference between the first values of the first and the second objects and using a second weight in conjunction with a difference between the second values of the first and the second objects, the second weight operating to restrict movement in a second direction other than the direction.

7. The method of claim 1, wherein the first and the second objects form a visual group in the chart, and wherein the set of inputs further includes a third input to allow leaving the visual group to a third object in a second visual group.

8. The method of claim 7, wherein the second visual group is adjacent to the visual group.

9. The method of claim 7, wherein the input is a keystroke, the second input is a different keystroke, and the third input is a combination of the input and a third keystroke.

10. The method of claim 1, wherein the second object is located at an angle from the first object, wherein the angle is different from the direction.

11. The method of claim 1, further comprising:
avoiding navigating to a third object, wherein the third object is closer to the first object in the direction but at a neighborhood distance greater than the shortest neighborhood distance from the first object.

12. A computer usable program product comprising a computer usable storage device including computer usable code for accessible chart navigation using object neighborhood, the computer usable program product comprising:
computer usable code for receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart;
computer usable code for identifying a second object to which to navigate responsive to the input, the second object being located within a neighborhood of the first object at a shortest neighborhood distance from the first object; and
computer usable code for navigating to the second object such that the navigation keeps the focus within the neighborhood of the first object.

13. The computer usable program product of claim 12, wherein the neighborhood is visually perceptible as a part of a visual group from a visual observation of the chart, wherein the neighborhood includes an area stretching along the direction and progressively reducing by a weight factor up to an angle from the direction, and excludes areas at angles greater than orthogonal to the direction.

14. The computer usable program product of claim 12, wherein the neighborhood distance is computed by weighting a value corresponding to the second object such that the value is not coincidental with the direction.

15. The computer usable program product of claim 14, wherein the value is an ordinal value of the second object along an axis of the chart wherein the axis is orthogonal to a second axis corresponding to the direction.

16. The computer usable program product of claim 12, wherein the neighborhood distance is computed using a value corresponding to the second object, wherein the value is computed using a characteristic of the second object, and wherein the characteristic is one of (i) a shape, (ii) a size, and (iii) a metadata associated with the second object.

17. The computer usable program product of claim 12, further comprising:
computer usable code for sorting the set of objects according to a first value associated with each object in the set of objects;
computer usable code for sorting the set of objects according to a second value associated with each object in the set of objects; and
computer usable code for computing the neighborhood distance using a first weight in conjunction with a difference between the first values of the first and the second objects and using a second weight in conjunction with a difference between the second values of the first and the second objects, the second weight operating to restrict movement in a second direction other than the direction.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A data processing system for accessible chart navigation using object neighborhood, the data processing system comprising:
a storage device, wherein the storage device stores computer usable program code; and
a processor, wherein the processor executes the computer usable program code, and wherein the computer usable program code comprises:

computer usable code for receiving, using a processor and a memory, an input to navigate a focus away in a direction from a first object, the first object being a member of a set of objects depicted in a graphical visual chart, wherein the input is a member of a set of inputs, the set of inputs designed to access the chart without the use of a pointing device and without requiring visual inspection of the chart and the set of objects, the set of inputs further including a second input to allow return to a previous step in navigating the chart;

computer usable code for identifying a second object to which to navigate responsive to the input, the second object being located within a neighborhood of the first object at a shortest neighborhood distance from the first object; and computer usable code for navigating to the second object such that the navigation keeps the focus within the neighborhood of the first object.

\* \* \* \* \*